United States Patent [19]

Enbergs

[11] Patent Number: 5,340,248

[45] Date of Patent: Aug. 23, 1994

[54] MECHANICAL CHUCK WITH CLAMP FOR PULLING TOOL SHANK TO TIGHTLY CLAMPED POSITION

[75] Inventor: Bernhard Enbergs, Dorsten, Fed. Rep. of Germany

[73] Assignee: Sandvik AB, Sandviken, Sweden

[21] Appl. No.: 933,103

[22] Filed: Aug. 21, 1992

[30] Foreign Application Priority Data

Aug. 21, 1991 [DE] Fed. Rep. of Germany ....... 4127661
Jul. 23, 1992 [DE] Fed. Rep. of Germany ....... 4224296

[51] Int. Cl.⁵ .......................... B23C 9/00; B23B 31/04
[52] U.S. Cl. ...................... 409/233; 279/89; 408/239 R; 409/232
[58] Field of Search ............. 409/232, 233, 234; 408/238, 239 R; 279/65, 89, 104, 105

[56] References Cited

U.S. PATENT DOCUMENTS

| | | | |
|---|---|---|---|
| 3,311,023 | 3/1967 | Kaiser | 409/233 X |
| 3,444,781 | 5/1969 | Sunderman et al. | 409/234 X |
| 3,533,638 | 10/1970 | Sedgwick | 279/89 |
| 3,599,996 | 8/1971 | Holt | 279/89 |
| 4,902,177 | 2/1990 | Burnett | 409/234 |
| 4,951,578 | 8/1990 | von Haas et al. | 409/232 X |
| 5,193,954 | 3/1993 | Hunt | 409/233 |
| 5,238,341 | 8/1993 | Horsh | 409/233 |

FOREIGN PATENT DOCUMENTS

| | | |
|---|---|---|
| 0273834 | 7/1988 | European Pat. Off. . |
| 0275911 | 7/1988 | European Pat. Off. . |
| 2545928 | 5/1977 | Fed. Rep. of Germany . |
| 3813670 | 11/1989 | Fed. Rep. of Germany . |
| 280061 | 6/1990 | German Democratic Rep. ............ 409/234 |
| 555220 | 10/1974 | Switzerland . |
| 272782 | 6/1970 | U.S.S.R. ............ 279/89 |
| 1113218 | 7/1984 | U.S.S.R. ............ 409/234 |

*Primary Examiner*—William Briggs
*Attorney, Agent, or Firm*—Burns, Doane, Swecker & Mathis

[57] ABSTRACT

A mechanical chuck for clamping the shank of a tool comprises a receiver having a forwardly open, rearwardly tapering socket. A pull rod is mounted for front-to-rear reciprocation in the socket. The pull rod is connectible to the tool shank. A plurality of pins are mounted in the receiver for front-to-rear movement therein. Rear ends of the pins engage the pull rod. A nut is threaded on the outside of the socket so that when rotated, the nut displaces the pins rearwardly. The pins displace the pull rod and shank rearwardly, so that the shank is tightly engaged in the socket.

25 Claims, 6 Drawing Sheets

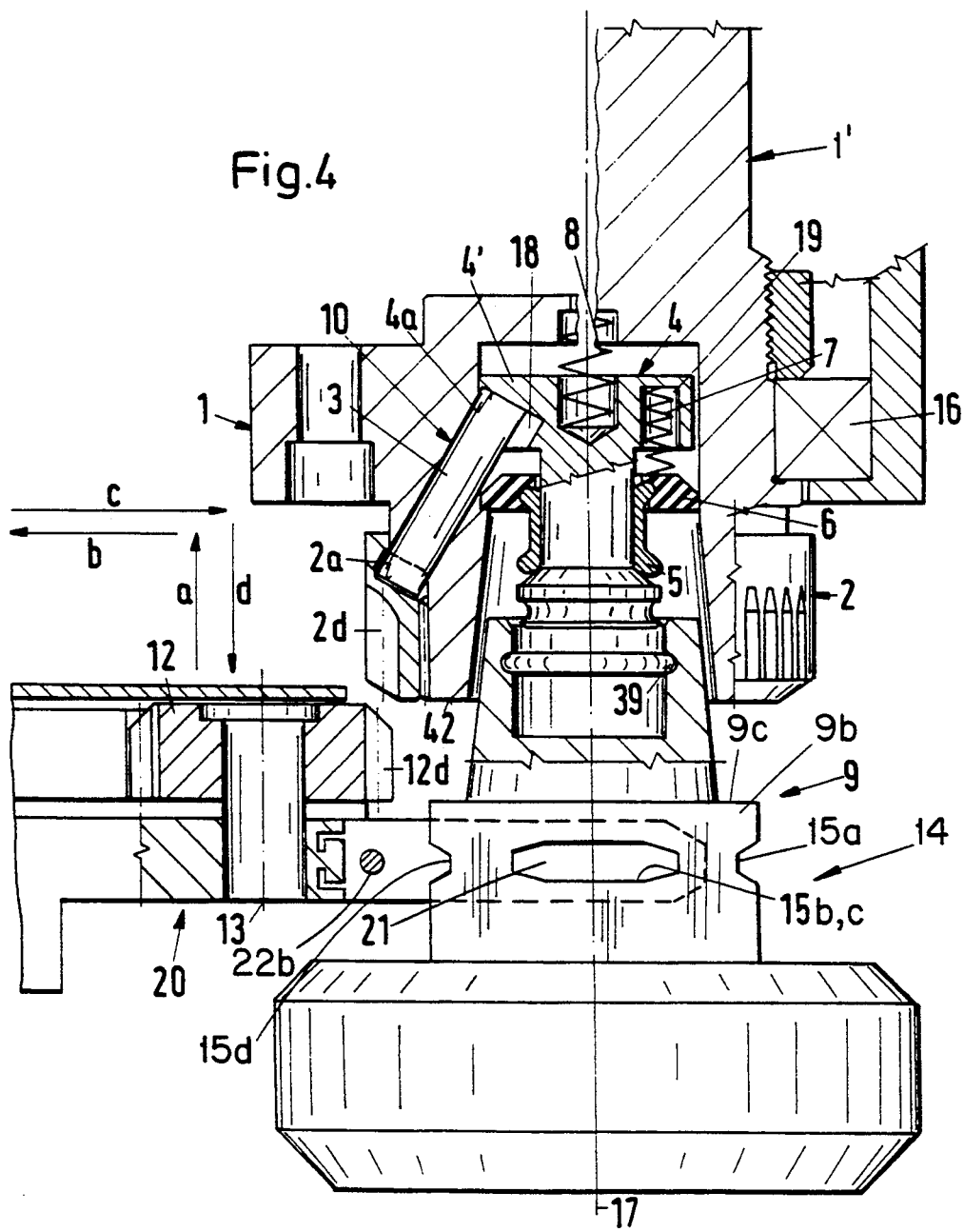

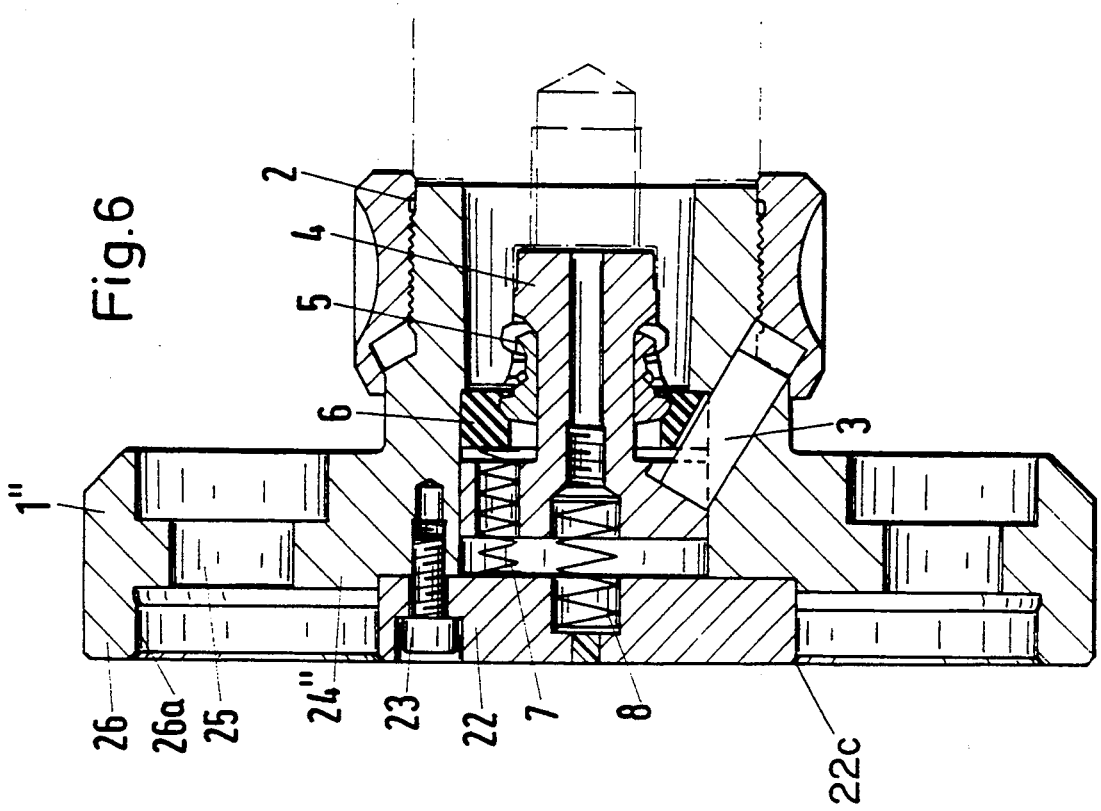
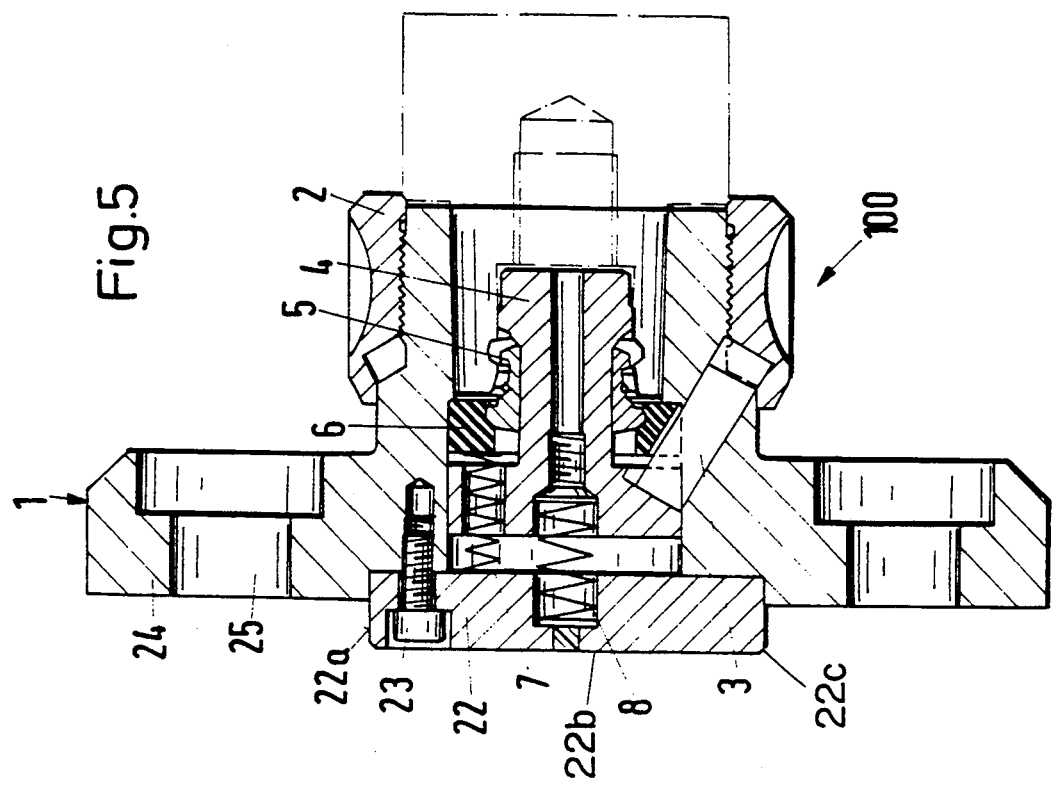

MECHANICAL CHUCK WITH CLAMP FOR PULLING TOOL SHANK TO TIGHTLY CLAMPED POSITION

RELATED INVENTION

The present invention is related to that disclosed in concurrently filed U.S. application Ser. No. 07/933,094, the disclosure of which is incorporated herein by reference.

BACKGROUND OF THE INVENTION

The present invention concerns a mechanical chuck for holding the shank of a tool in a hollow receiver in which a pull rod is disposed. By "tool" is meant a tool per se, or a tool holder, or other elements having a shank.

In a prior art chuck device a pull rod (or tension element) is centrally disposed in the tool receiver, the end surface of the pull rod being conical. Pins have one end lying on this conical surface. The pins project through the receiver, that is in the form of a cylindrical journal, from the interior outwards, and the other ends of the pins contact a conical surface of a hollow shank connected to the tool. Under tension, the conical end section of the pull rod forces the pins outwards in an essentially radial direction with a small axial component, so that the pins make contact with the conical inner surface of the hollow shank and move this shank in an axial direction over the journal until a stop is reached.

In the present invention, it is regarded as being disadvantageous that one must have direct or indirect access to the pull rod from the reverse side of the receiver in relation to the tool, in order to be able to move this pull rod in an axial direction. This requires a central through-boring of corresponding power transmission elements. However, it must be ensured that the pull rod also remains constantly under tension in the case of a rotating spindle. The shank formed as a trunnion is pushed away from the pins by relatively strong radial force components, which can adversely affect the exact fit of the shank in the receiver.

There are other well-known chucks in which the shank receiver is formed from a hollow element such that it can also receive the shank of a tool together with the pull rod. Thus, the afore-mentioned problems of fitting, that can arise with the use of a hollow shank, are compensated for, because the shank has a generally conical outer surface which enters an inner surface of the receiver, whereby the generally conical surfaces (e.g., abruptly beveled shanks) provide for an exact fit.

Nevertheless these other well-known chucks require access from the rear side of the receiver, so that the pull rod can be operated.

In addition to the above-mentioned chuck, there are also well-known simple drilling machine chucks, for example, in which clamp elements extending outwards are squeezed together by a clamping nut and thereby hold a drill shank or the like. These kinds of chucks are however relatively inaccurate, as they exert an axial strain on the shank to be held, which, just like the corresponding receiver, has no precisely defined surface that defines the exact reproductable fit for the shank or tool by lying one on the other.

SUMMARY OF THE INVENTION

Regarding the well-known states of the art, the aim of the present invention is to further develop the first-mentioned type of mechanical chuck, such that access from behind the tool for operation of the pull rod is not necessary, whereby a precise fitting of the shank, and thus the tool connected to the shank, can be simultaneously guaranteed.

Concerning the first-mentioned state of the art, the purpose of the present invention is achieved by the fact that the shank receiver is formed as a hollow element in such a manner that a fitting shank is drawn in by a pull element. The shank receiver is provided with an external thread and has a fitted clamping nut and the clamping nut has a circular support surface for the pins. The circular support surface is so aligned that when the clamping nut is rotated in the direction of tightening, it presses the pin against the pull rod through borings in the receiver.

All of the above-mentioned disadvantages of state of the art chucks can be avoided by this design. By employing a clamping nut and a force transmission by extending via through-borings in the receiver from the clamping nut to the pull rod with the assistance of pins, access to the receiver is only necessary from the front. In particular, there is no longer any need for any mechanics, placed under strain by the tension element, on the back of the receiver. Borings are still necessary for a coolant feed. The direct contact of the pins with the hollow shank of the tool is advantageously avoided, such that the exact fit of the tool cannot be adversely affected by localized deformation. The pins come directly into contact with the pull rod, which carries locking elements for contact with the shank such that the latter is drawn into the receiver in an axial direction and held tightly.

In this way, a high degree of fitting, achieved by drawing in the shank, together with its correspondingly fitting surfaces, into a hollow receiver with the assistance of a pull rod is maintained.

For the sake of simplicity, in the following text reference may be made merely to a shank generally or a tool shank, whereby it is understood that this shank need not be directly connect to a tool, but can be formed on a tool holder which itself carries a tool, whereby additional retaining and adjustment elements can be inserted.

In the chuck in accordance with the present invention, it has proven useful for the pin borings to lie in a place which contains the axis of the chuck and therefore for these borings to be inclined at an angle of less than 45° to the axis of the chuck. On the one hand, the borings must indeed run from the interior of the hollow space of the receiver to the outside of the device, as this is where the exterior thread with the clamping nut lies, which for its part must force the pins into the borings, such that the radial components of the borings can only be avoided with difficulty, unless one wishes to design a greatly projecting receiver with a deep removed section inside it. On the other hand, an angle between the borings and the axis of the chuck that is as small as possible is preferable because in this way less force is necessary to overcome friction and the clamping power can be optimally geared by the receiver via the pitch of its screw to the pull rod.

It is, therefore, preferable to have an angle of 30° between the axis of the chuck and borings for the pins.

Moreover, in the favored embodiment of the invention, the external thread should extend from the front end of the receiver by a distance that is less than the axial length of the clamping nut and preferably such that the clamping nut thread extends essentially as far as the front end of the receiver. In this case it is possible, when loosening the clamping nut, for the front end of the clamping nut facing the tool to come into contact with the shank and to release the shank from the receiver.

To this end it is of course appropriate for the outer diameter of the receiver at its front end to be smaller than the diameter of a surface of contact with the shank that extends perpendicularly to the axis of the chuck.

The surface of support for the pins on the clamping nut is appropriately a surface that is conical the angle of which, in relation to a plane perpendicular to the chuck, is the same as the angle of the borings or pins to the axis of the chuck. In this way, the conical surface intersects the axis of the borings at an exact right angle and the full cross-sectional area of the pins can lie on the support surface.

Also, it is preferable that the afore-mentioned support surface is formed as the side wall of a V-shaped groove running around the inner surface of the clamping nut. The formation of such a V-shaped groove provides for safety against full release of the clamping nut, as is later described in greater detail.

The pull rod is T-shaped in longitudinal section, the web of which is formed from an essentially cylindrical element, in a known fashion, on which finger-stays lie. A flange element of the pull rod has open recesses in the directions of the pins. The bases of the recesses offer a surface of contact for the pins. An advantage of having the pins received in recesses in this way is that the pull rod cannot twist, which reliably secures the pull rod in the receiver. Additional secondary recesses in the flange element of the pull rod are provided between the recesses that take up the pins in a favored embodiment of the invention. The secondary recesses are open in an axial direction and each receives a spring which is supported at the other end by a support ring holding a finger stay, the support ring lying on a collar that projects at least partly inwardly on the inside of the receiver.

Such a support ring essentially has the function of holding in position the periphery of the cylindrical web element of the finger stays, disposed on the pull rod, that are forced outward in an axial direction with a corresponding axial movement of the pull rod. The finger stays are locked in corresponding grooves of the hollow tool shank so as to catch the shank. In addition a certain relative movement between the finger stays and the pull rod is necessary such that the former can be pushed away by the conical extension and brought into contact with the groove in the shank element. The support ring lies on a collar such that the finger stays cannot be pushed away by the conical extension, if the pull rod is in its outward position of release.

In addition to the foregoing, a spring between the receiver and the pull rod is also provided that biases the pull rod in the direction of release, in the favored embodiment of the invention. The pull rod is thus pushed axially outwardly and pushes the pins also outwards through their borings to a limited extent allowed by the support surface of the clamping nut.

At the same time this makes the clamping nut more secure because when the clamping nut is loosened, the right-angled wall of the V-shaped groove of the clamping nut comes to bear against the side surface of the pins. Thus, with the pins pressed out, the nut is not allowed to loosen beyond a certain distance.

The chuck in accordance with the invention has the great advantage that it can be mounted not only on standing machine parts, but also on rotating machine parts or spindles.

The hollow cavity in the receiver that receives the shank appropriately has a polygonal cross section. Preferably, the corners of the polygonal cross section are rounded off and the sides between these rounded corners are slightly convex-curved such that sides and corner sections come smoothly against and over each other. In particular, a cross-section for the shank and the cavity is favored, in which the primary form is an equilateral triangle having rounded corners. Also, the shank and the cavity gradually taper in an axial direction, whereby after the cavity has tapered to a predetermined minimum size, it joins a cylindrical hollow section, the diameter of which preferably corresponds to the maximum cross-section of the polygonal cavity at the narrowest point of the cavity. The hollow section is essentially only present along the only slightly convex-curved side edges of the polygonal cross-section and diminishes to nothing in the corner areas. The tapering of the cavity in the axial direction, and the polygonal cross-section of the cavity are independent features.

With such a receiver, it has proven advantageous for the flange element of the pull rod to have the same cross-section and maximum diameter corresponding to the narrowest point of the cavity. In this case, with the correct orientation, the flange element can be pushed into the hollow section and then, by a turn through half the polygonal angle, can be secured in this hollow section as its ends overlie the removed side area of the underlying polygonal cross-section.

By polygonal angle is meant the angle between the line of connection of the adjacent polygonal corner with the center.

With the flange element in this rotated position, in accordance with the favored embodiment of the invention, the borings for the pins and the recesses in the flange element for receiving the pins are aligned with each other.

The flange element is thereby secured against rotation by the pins and securely retained in the hollow section such that it cannot be accidentally dislodged. The additional support ring disposed under the finger stay should be made of pliable elastic material and have a cylindrical outer dimension equal to that of the hollow section. Because of its elasticity this support ring can be compressed and pushed into the hollow section, via the narrow point of the polygonal cross-section, and then re-expand to its full diameter, whereupon this support ring will lie on the collar forced by the hollow section.

The clamping nut can either be held under tension and released by hand or with the help of a tool. However, an embodiment of the invention is preferred in which the outside of the clamping nut is shaped for locking with a mechanical drive element, as described for example in the afore-mentioned concurrently filed application Ser. No. 07/933,094. This shape preferably takes the form of external indentations or toothing on the clamping nut. The mechanical drive can be a motor-driven pinion for example, which is axially and/or radially adjustable relative to the clamping nut and which can thereby be brought into and out of contact with the toothing of the clamping nut, whereby the axis of rotation of the pinion preferably runs parallel to the axis of the chuck. The mechanical drive element can be rotatably supported on a gripping device for the shank, so that the gripping element can grip the shank, and simultaneously the drive element can engage the nut.

Many automated tool changes take place in machine tools in which a gripping device usually holds the shank of a tool in a side area and remains external to the chuck when the shank is under tension. This gripping device directs the shank at the right orientation into the receiver cavity, at which point an additional fixing device is brought into play to place the introduced shank under tension, whereupon the gripping device is released. In accordance with the invention, the gripping device and pinion form a commonly movable unit, whereby the gripping device holds the shank and the pinion works the clamping nut. At the same time, it is particularly advantageous that the gripping device holds the shank against rotation while the nut is being rotated. Hence, the receiver, e.g., in the form of a rotary spindle, does not have to be held against rotation by other means.

A particular embodiment concerns the adaptation of the chuck such that it can be directly used with already existing and otherwise standard machines. This is achieved in that a connection element for connection with a standard interface of a machine tool is provided on the reverse side of the chuck in accordance with the invention. Accordingly, the chuck therefore has an adaptor element for attachment to traditional machines.

In the favored embodiment, the above-mentioned interface takes the form of a flange with a centering element. The centering element can be an inner centering element in accordance with different embodiments of the invention, i.e., a trunnion, that locks a machine tool into a centering opening of the corresponding holder, it can, however, also be in the form of an encircling collar or separate projections that lock a machine tool from the outside into centering braces or the like with a centering surface that fits. Similar to the other normal machine tool holders, flangible, attachable adaptors are provided that lock into one another and effect a centering of the tool mounted on the chuck in relation to the machine tool. An inner centering with a trunnion or braces is favored, that extends from a flange that can, in accordance with German Industrial Standard 2079, be put onto a spindle head or that has corresponding external centering on a steeply beveled uptake. There are also tool holders for cylindrical shanks, that have toothing, in accordance with the German Engineers Association Guideline 3425 or corresponding German Association of Mechanical Engineers interfaces. The mechanical chuck in accordance with the present invention can be equipped with a fitting connection element, on the side away from the tool, so that this chuck can also be used to advantage on already existing machine tools with stationary or rotating receivers for a tool holder.

BRIEF DESCRIPTION OF THE DRAWING

The objects and advantages of the invention will become apparent from the following detailed description of preferred embodiments thereof in connection with the accompanying drawings, in which like numerals designate like elements and in which:

FIG. 4 is a longitudinal sectional view of the embodiment according to FIG. 1 together with a tool shank and an actuator for the pull rod;

FIG. 5 is a longitudinal sectional view of a third embodiment of a chuck according to the present invention;

FIG. 6 is a longitudinal sectional view of a further embodiment of a chuck according to the present invention.

DETAILED DESCRIPTION OF PREFERRED EMBODIMENTS OF THE INVENTION

Figure 1:
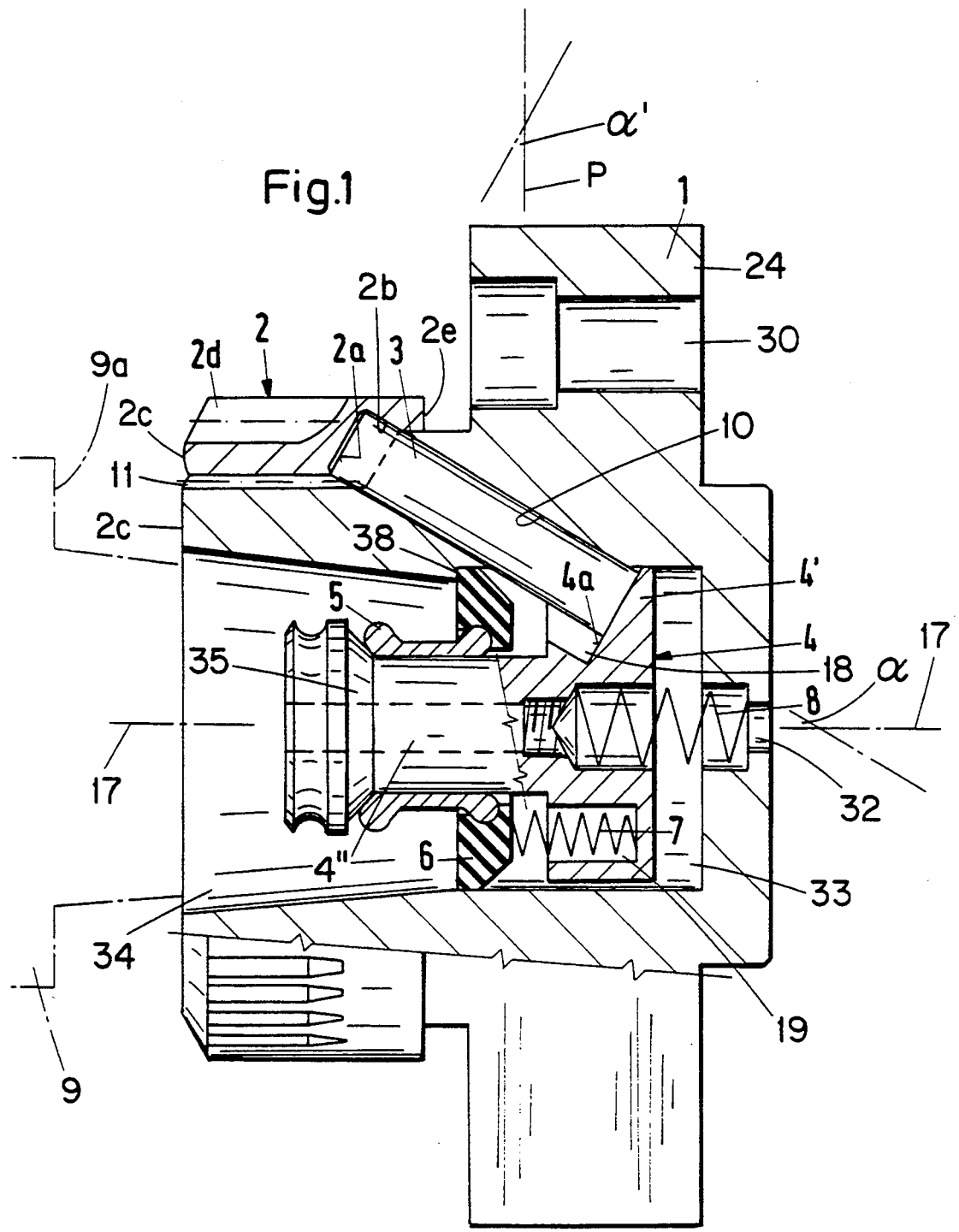
FIG. 1 is a longitudinal sectional view of a first embodiment of a chuck in accordance with the present invention.
Figure 2:
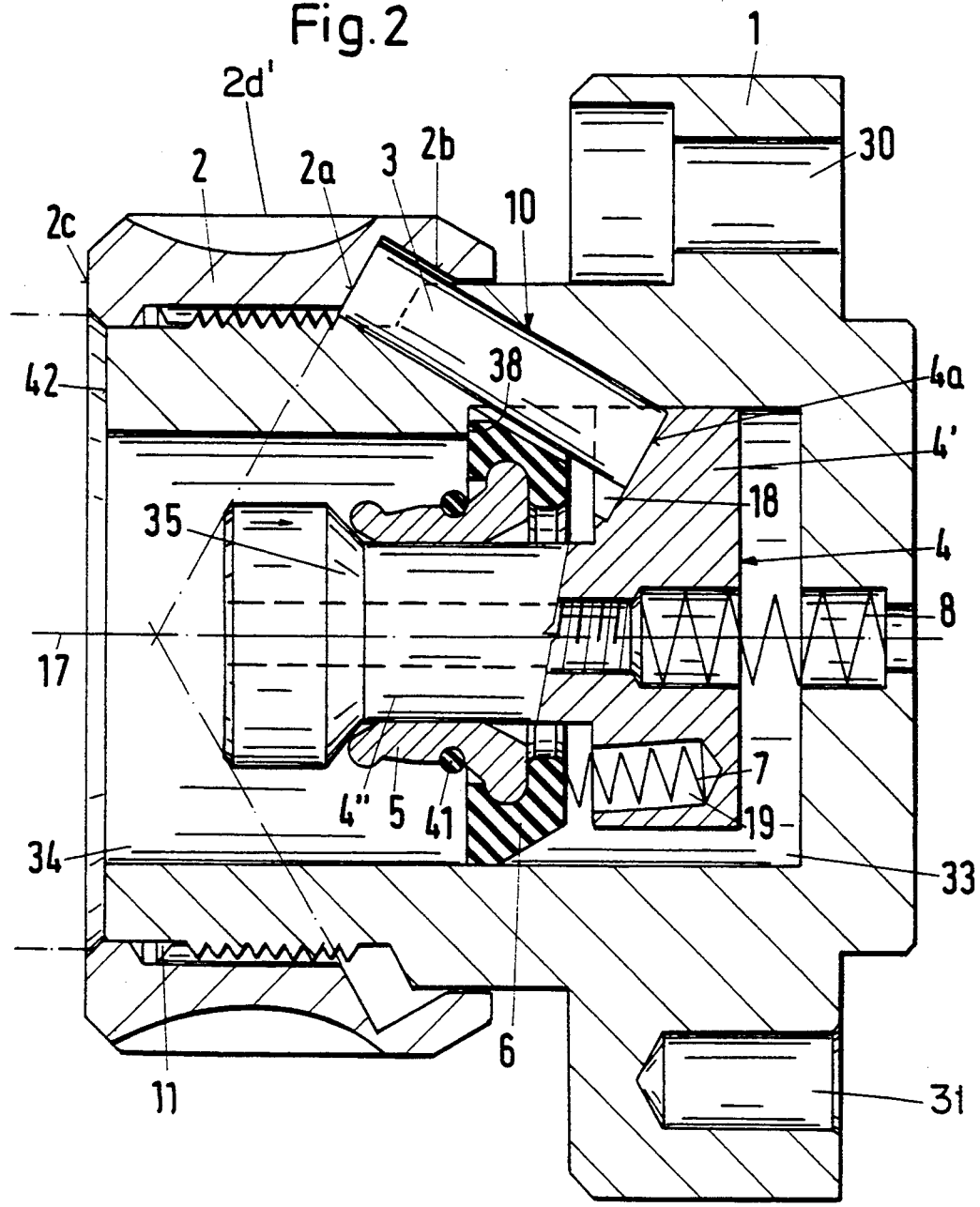
FIG. 2 is a longitudinal sectional view of a second embodiment of the invention.
Figure 3:
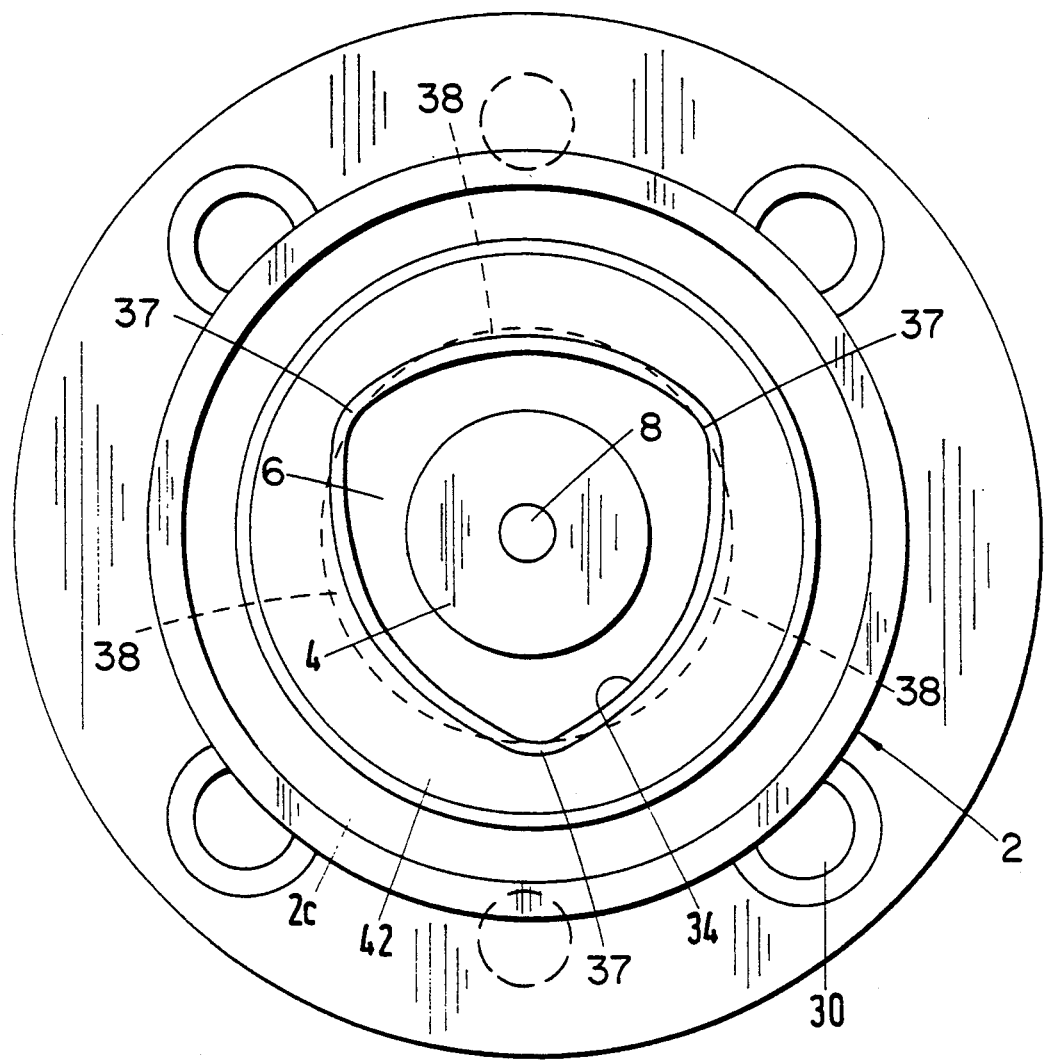
FIG. 3 is an end view of the open end of the receiver of FIG. 1.

In FIGS. 1 and 2 there can be seen a tool or shank receiver 1, which can be mounted on a stationary or rotating machine element, with the help of the boring 30 or a tap hole 31 (see FIG. 2). The receiver 1, which is shown in FIGS. 1 and 2 in an axial longitudinal section, comprises an essentially hollow cylindrical element having a cylindrical cross-section which is open on a front side (left side in FIG. 1) and is essentially closed on the other (rear) side except for a coolant boring 32. Encircling the closed end is a circling flange 24 in which borings 30, 31 are disposed. The receiver has a plurality of bores 10, one of which being depicted in FIG. 1. The axis of each bore 10 extends at an angle $\alpha$ of less than 45° and preferably about 30° to the axis 17 of the chuck. Each bore extends from the radial outside to the radial inside in a rearward direction. That is, the bores converge toward the axis 17 in a right-hand direction in FIG. 1. A front socket or cavity 34 of the receiver that gradually tapers rearwardly from its opening and which receives the tool shank, is not of circular cross-section, but rather has a more or less polygonal cross-section (see FIG. 3). The corners of the polygon are rounded off, and the sides of the polygon are "baggy", such that although the basic polygonal form is still recognizable, there are no sharp edges or corners on the perimeter. The polygon is essentially in the shape of an equilateral triangle, whereby the cross-section of the socket 34 as shown in FIG. 3 (in spite of the rounding off of corners) still differs considerably from a circular cross-section. This shape in particular facilitates the transmission of torque forces from the chuck to the tool shank and vice versa.

In socket 34 and contiguous hollow space 33 of the receiver there is disposed a pull rod or tension element 4, the shape of which, from a side view (i.e., along the axial longitudinal section), can be generally characterized as T-shaped with a flange element 4' and a web 4" for transmission of tractive power.

The flange element 4' has the same polygonal cross-section and in particular the same length as the polygonal socket 35 at its narrowest point. The pull rod 4, together with its flange 4', can therefore be introduced into the socket 34 and be pushed as far as the area of the hollow space 33. In this position it is turned by 60°, which corresponds to half the polygonal angle of 120° (the same as the angle between the line of connection of each two adjacent corners of the polygon with the center). The radius of the cylindrical hollow section 33 corresponds exactly to the maximum radius of the polygonal cross-section of socket 34 at its narrowest axial location (see the broken lines in FIG. 3). This means that the socket 34 merges into the hollow space 33 without the presence of a step or an interruption at three equidistantly spaced locations. In between those locations 37, three steps 38 are formed (see FIG. 3). These steps form contact surfaces for a support ring 6 in which finger stays 5 are mounted. Even without the support ring, the pull rod is nevertheless secured when inserted in socket 34 and hollow space 33 if it is held in its rotated position in space 33 at an angle of 60° to the polygon.

The flange element 4' has altogether three recesses 18 distributed along its perimeter and separated by an angular distance of 120°, the bases 4a of the recesses each presenting a surface of contact to the end face of a pin 3. In the middle between the recesses 18, three further recesses 19 are provided which receive a spring 7 that is compressed between the support ring 6 and the flange 4'. The support ring 6 has the same cylindrical cross-sectional size as the space 33 and is made out of a pliable elastic material, such that it can be distorted and pushed through the narrow point formed by the junction of socket 34 and space 33, so that it finally re-expands and assumes a position on the steps 38.

Three pins 3 extend through three borings 10 distributed about the perimeter of the receiver 1. One end face of each pin, as mentioned above, is in contact with surface 4a in the recess 36, the other end bearing against a conical surface 2a that is formed on the interior of a clamping nut 2. The pins have a diameter preferably greater than 5 mm, e.g., 7 mm for example. The conical surface 2a is formed by mill-cutting or drilling a V-shaped groove on the inner surface of the nut 2. In profile, the sides 2a, 2b of the V-shaped groove form an angle of 90° with each other, whereby the surface 2b is parallel to the pin axis, while the other surface 2a forms a support surface that is exactly perpendicular to the axis of the pin 3, such that the end faces of the pins 3 lie relatively extensively on the support surface 2a. The clamping nut 2 is screwed onto a male screw thread 11 which is formed at the front end of the receiver 1. The surface 2a forms, together with a line P perpendicular to axis 17, an acute angle α' which is equal to angle α.

From FIGS. 1 and 2 it is easy to see how, when the clamping nut 2 is rotated, it is moved towards the closed end of the receiver 1 in an axial direction, whereby the pins 3 are pushed further rearwardly inward and transmit an axial pushing force onto the flange element 4' of the pull rod 4. The pull rod therefore moves in an axial direction further into the socket 34. Because the springs 7 push the support ring 6 away from the flange element 4 of the pull rod, there occurs relative displacement of the web 4'' in relation to the finger stays 5 held by the support ring. At least two, preferably three or more, of the finger stays are disposed around the rotationally symmetrical web 4'' of the pull rod 4. In the process, the lower ends of the finger stays slide onto a conical extension 35 of the web 4'', and thereby are pushed radially outwardly into the groove 39 of the hollow shank 9 of a tool (see FIG. 4 in which a shank 9 is represented in a side and partly cross-sectional view and which will be pushed far enough into the socket 34 for the thickened ends of the finger stays 5 to come into contact with the groove 39).

After the thickened ends of the finger 5 have been locked in the groove 39 through the spreading of finger stays 5 on the conical surface 35, nut 2 continues to be turned, and therefore the finger stays and also the shank 9 are carried rearwardly (inwardly) in the direction of clamping by a further axial movement of the pull rod 4, such that the polygonal faces of the shank 9 and socket 34 bear tightly against one another. In the process, the pins 3 are pushed in their longitudinal direction, whereby they impose both an axial and a radial push upon the flange 4'.

The nut 2 is turned in the opposite direction to release the shank 9 from the receiver 1. Because of the tight-fit of the shank 9 in the socket 34, the pull rod 4 remains stationary, as the force of the spring 8, which pushes the pull rod in the direction of release, is not sufficiently strong to release the shank from its friction-fit. Since the male screw 11 extends essentially to the front end of the receiver 1, the nut 2 can be unscrewed past the front edge of the receiver 1, whereby the front face 2c of the nut 2 comes into contact with a surface of contact 9a on the shank 9, such that the shank 9 can be pushed from its tight-fit by the force transmitted by the pitch of the thread 11.

The pull rod 4 is thus pulled in the direction of release along with the shank, while being pushed by spring 8, until it reaches approximately the position shown in FIGS. 1, 2 and 4. In this position the nut 2 cannot be unscrewed much further in the direction of release as the surface 2b comes into contact with the sides of pins 3 which thereby blocks the nut 2 against full removal.

One can proceed as follows when assembling the chuck. To begin with, the slightly elastic support ring 6 is pushed onto the extended front edge of the pull rod 4. The finger stays 5 are disposed along the perimeter of the cylindrical web 4'' and brought into contact with a fitting support groove in the inner surface of the support ring 6. The springs 7 are disposed in the three recesses 19. If desired, a spring washer (such as shown at 41 in FIG. 2) is pushed over the extended end of the web element 4'' and the finger stays 5, the spring washer being received in appropriately sized grooves of the finger stays 5 to hold the latter in fast contact with the cylindrical exterior of the web 4''.

The spring 8 is inserted in the corresponding clearance in either the receiver 1 or the pull rod 4. In this premounted sate, the pull rod 4 with its flange element 4', in the orientation appropriate to the polygonal socket 34, is pushed into the socket 34. The flange element 4', as already mentioned, has dimensions such that it can be pushed through the narrow point that is formed at the junction of the socket 34 and the hollow space 33. Also the support ring 6, which is preferably made from a synthetic elastomer, can, when distorted, be pushed through this narrow junction and re-expand afterwards such that it lies on the steps or collar 38. The flange element 4' is now turned through 60° in relation to the socket 34, so that the borings 10 are aligned with the recess 36 on the flange element 4'. The pins 3 are pushed into the borings 10 and the recesses 36. The pull rod 4 is now secured against turning.

The clamping nut 2 is now screwed onto the male thread at the front end of the receiver 1. The receiver 1 is preferably oriented upside down such that the pins cannot gravitate out of the borings 10 in the mean time. (In the case where an additional provisional support ring can be provided for the pins, or the pins cannot be placed in the borings with a thick covering of grease such that they cannot fall out.) When the clamping nut is screwed on, the pins 3 push the pull rod further inwards against the force of spring 8. The pull rod 4 could instead be pushed inwardly by a suitable tool, to enable the pins 3 to be pushed inwardly sufficiently for that the surface 2b of the nut 2 slides past the pins without contact therewith. Because of the compression of spring 8, the pull rod 4 is afterwards pushed outwardly in the direction of release, whereby the pins 3 are also pushed outwards and occupy the intended position in the V-shaped grooves 2a, 2b on the interior of the nut 2.

The cross-section of the receiver expands at the rear end of the male screw thread, to limit the extent to which the nut 2 can be screwed onto the thread.

For disassembling the whole device, the pull rod is again pushed into the space 33 against the force of the spring 8 with the help of an auxiliary device, whereby the receiver 1 has its closed side (right side) oriented downwards, so that the pins 3 follow this movement of the pull rod under the effect of gravity and release the V-shaped groove of the clamping nut. After the nut is fully unscrewed, the pins 3, by turning the receiver 1 upside-down, can be taken out of the borings, so that the pull rod 4 can be turned to an orientation where its flange element 4' fits through the polygonal cross-section of the socket 34. Following this, the pull rod 4 is pulled out of the socket 34. The elastic support ring 6 is then distorted and removed from the socket.

The two embodiments of the invention shown in FIGS. 1 and 2 differ slightly in the external design of the clamping nut in that, in the embodiment in accordance with FIG. 2, the nut 2' has external recesses or flats 2d' which enable the nut to be rotated by hand or with the help of a suitable tool, e.g., a wrench or the like, for example. The nut 2' could also have parallel surfaces for contact with a spanner wrench or the like.

In the embodiment of the invention in accordance with FIG. 1, the exterior of the nut 2 is specially designed for contact with a mechanical drive element, in particular a pinion, as shown in FIG. 4. In FIG. 4 it can be seen that the shank 9 has a lower cylindrical extension with four notches 15a–15d along its perimeter, the notches being separated by an angular distance of 90°. This structure is also disclosed in concurrently filed application Ser. No. 07/933,094, the disclosure of which is incorporated herein by reference.

A gripping device 20 is provided for moving the tool and for rotating the nut. The gripping device 20 comprises a movably mounted fork 22 which includes a pair of parallel arms 22a (only one arm 22a being depicted) which are spaced apart in a direction perpendicular to the axis 17. Each arm 22a carries at its outer end a gripping element 21 which projects laterally toward the other arm. Each gripping element is configured to fit within one of the four identical notches 15a–15d formed in a cylindrical shank part 9b. Note that both notches 15b, 15c are visible in FIG. 4 because they are radially aligned in a direction perpendicular to the plane of the drawing. The gripping element 21 shown in FIG. 4 is engaged in the notch 15b located farthest from the viewer; that gripping element 21 is visible through the notch 15c located closest to the viewer.

When the fork 20 approaches the tool 14 in radial direction b, the arms 22a are spaced apart by a distance greater than the diameter of the shank part 9b so that the arms straddle that shank part. Then, the arms 22a are moved toward one another by a suitable mechanism such as an electric solenoid 22b which interconnects the arms 20a. Instead of being arranged to engage the notches 15b, 15c, the arms 22a could instead be arranged to engage the other two notches 15a, 15d and to move in a radial direction oriented perpendicular to the direction b (i.e., into and out of the plane of the drawing). The particular structure of the gripping device 20 is not critical to the present invention and thus any conventional gripping device could be employed. However, by using an arrangement in which locking elements fit into specifically located notches, the rotational orientation of the tool is defined by the location of the notches, which orientation is maintained during the entire travel of the tool during a tool changing process, because the tool is not rotated even in the storage magazine.

The movement of the gripping device 20 is diagrammatically shown by the arrows a, b, c, d, the movement a corresponding to the axial inward movement of the shank 9 into the shank receiver, and the direction of movement d corresponding to the axial outward movement therefrom.

The receiver is shown in the left side of FIG. 4 as comprising a fixed member 1, and is shown on the right side of FIG. 4 as alternatively comprising a rotary spindle mounted in a bearing 16. For clamping, therefore, the shank part 9a is inserted in the direction a by the gripping device 20, the gripping elements 21 of which being engaged in the notches 15 of the shank part 9b.

As explained previously, by rotating the union nut 2 in a clamping direction, the pull rod 4 is, by the pins 3, moved axially inwards. The conical surface 4b moves within the clamping fingers 5 in an axial inward direction. The clamping fingers 5 are spread outwards by the conical surface 4b to engage the groove 39. Then, the fingers 5 are moved in the axial direction with the pull rod 4 when the nut 2 is rotated. Consequently, the fingers 5, the shank part 9a, and the entire tool 14 move simultaneously in the axial inward direction. The outer surface of the shank part 9a is brought to bear tightly against the inner surface of the shank in the shank receiver. The gripping element 21 holds the tool 40 against rotation and thus counteracts the torque exerted onto the nut 2 by the pinion 12. Thus, if the shank receiver comprises the rotary spindle 1', that spindle need not be fixed against rotation by other means.

Subsequently, the gripping elements 21 are released and the entire gripping device 20, together with the pinion 12, is moved away in the radial direction b from the receiver and the tool 14.

For the releasing and removal of the tool 14, the gripping device is moved in the direction of the arrow b or a towards the receiver and the tool. The teeth 2d, 12d lie at the same axial height, and thus are brought directly into mutual engagement as soon as the gripping device 20 has reached the shank part 9b.

In this position, the gripping elements 21 are engaged into the notches 15b, 15c and thus secure both the tool shank 9, and the rotary shank receiver 1' against being rotated by the torque applied to the nut 2. By rotating the pinion 12, the nut 2 turns on the outer thread of the shank receiving part 1 and moves in an axial outward direction, whereby its front face comes into engagement with a radial surface 9c of the shank and thereby forcibly pushes the shank out of the socket. The gripping device 20 can then move in the axial outward direction shown by the arrow d, thus taking along with it the tool 14 and disengaging the teeth 12d, 2d.

The tool 14 is then moved by the gripping device in a conventional manner from the receiver to a magazine (not shown) where it is deposited, and possibly a new tool 14 is seized by the gripping device 20 and introduced into the receiver.

As pointed out already, in the left half of FIG. 4, the receiver 1 is shown as the afore-described stationary machine element 1, while in the right half of the illustration the receiver 1' is shown as a rotary spindle which rotates in a bearing 16. Such an embodiment of the invention would be marked or have other means of identification put on it, clearly indicating the necessary orientation of the axle or receiver 1'. In the case of fixed integral multiplications, the point of rotation can also be set by an electronic revolution counter. One advantage of the chuck supplemented with an automatic gripping device is that, with the help of the pinion 12, the receiver 1' is fixed before the introduction of the shank 9 or before release of the shank 9, because first, the rotation of the pinion and the clamping nut, that itself (possibly according to a certain number of missed revolutions) catches the receiver 1' until the correct orientation of the receiver 1' has been set with the aid of a suitable sensor or sensory mechanism.

When putting the chuck under tension or releasing it, the counteracting force necessary for tightening or loosening the clamping nut is taken up by the gripping elements 21 via the shank 9, such that it is not necessary to provide a special device for fixing a rotary receiver 1'.

FIG. 5 essentially corresponds to FIG. 1, where, however, an inner centering journal or element 22 extending away from the receiver 1 on the side thereof opposite the tool, is fastened to the receiver by a bolt 23.

The centering element 22 has a cylindrical centering surface 22a that could, if necessary, be slightly conical. In order to achieve better insertion of the centering journal or centering element 22, the transition from the flat external rear surface 22b to the surrounding cylindrical centering surface 22a is beveled at 22c. The flange 24 surrounds the centering element 22, it being possible for example to attach the flange to a spindle head with a tapered head in accordance with German Industrial Standard 2079, whereby the centering element 22 slides into the bevel uptake and centers the mechanical chuck, which is indicated as a whole by the number 100. Thus, the flange 24 would lie tightly on the corresponding flange element of the spindle head, which is surrounded by the taper uptake. The flange 24 is finally attached with bolts that are not shown, that extend through through-bores 25 and lock into corresponding tap holes on the flange element of the spindle head.

Naturally, the machine tool does not have to have a beveled spindle head in order to fix the chuck in accordance with the invention in a well-defined position, but it is far preferable if the suitable tool head of the machine tool has a flange or a flat surface of contact with a central centering bore for taking up the centering piece 22, whereby the corresponding tap holes for bolts must also be present in the flat surface, the bolts passing through the fixation bore 25 of the flange 24.

FIG. 6 shows a mechanical chuck 101, that differs from the chuck 100 only in that the flange 24" of the receiver 1" is provided with a surrounding collar 26, the cylindrical inner surface 26a of which holds a corresponding cylindrical shank or connecting piece of a tool head of a machine tool. Here also, the free edge of the cylindrical centering surface 26a is beveled at 22c in order to facilitate fixation to the connecting piece or the like. The inner element 22 hereby locks into a boring of the connecting piece on the tool head of the machine tool, yet does not serve the centering process, as the surface 26a performs this function. This mechanical chuck 101 is also fixed with the aid of fixation bolts that are not shown and that pass through the fixation bores 25 and are screwed into corresponding tap holes on the tool head of the machine tool.

Naturally, other kinds of connection apart from bolting on with the aid of fixation bores 25 can also be used.

Figure 7:
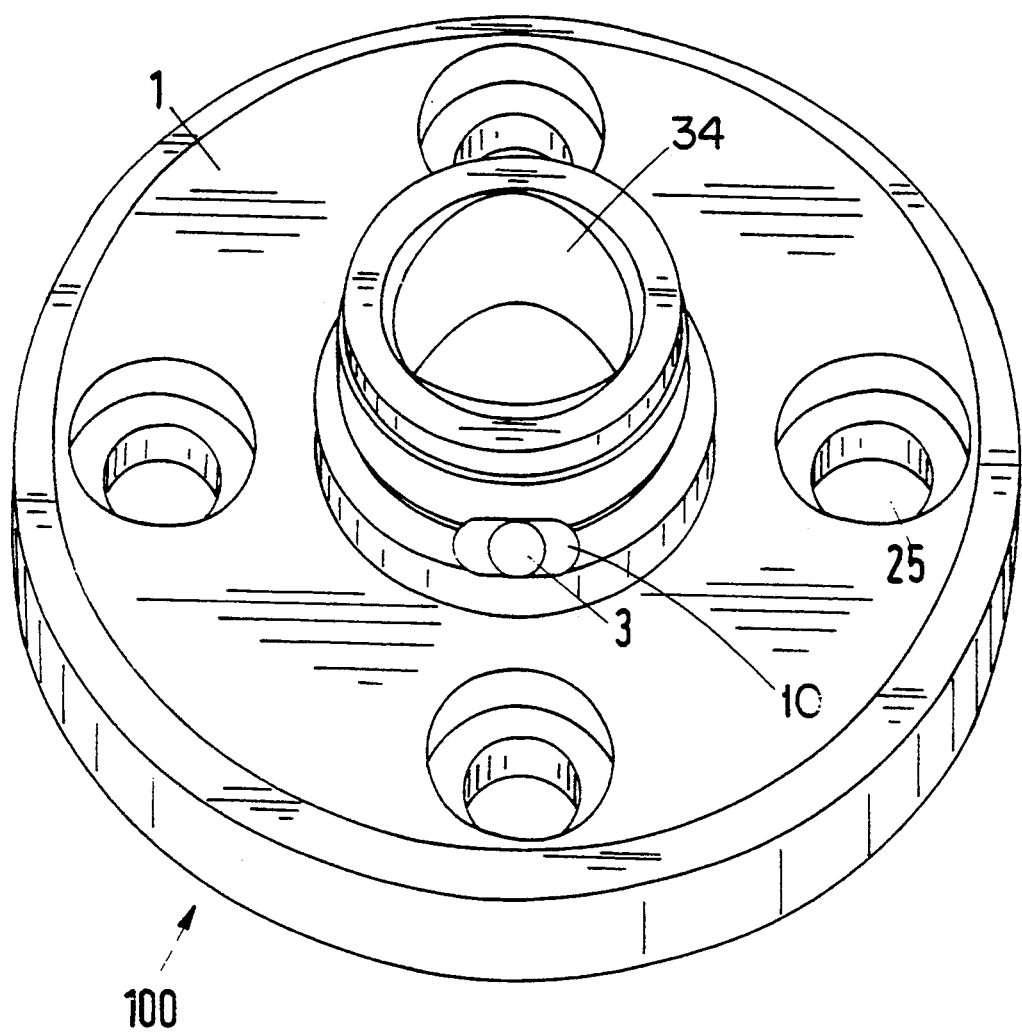
FIG. 7 is a perspective view of the FIG. 1 chuck without a clamping unit.

FIG. 7 shows a perspective view of the tool holder 100 or 101 without the clamping nut 2. One recognizes the four fixation bores 25 for the flange 24 and, in the plan view, a pin 3 in a corresponding opening, as well as the socket 34 with the specially shaped cross-section for the receipt of a tool shank.

Although the present invention has been described in connection with preferred embodiments thereof, it will be appreciated by those skilled in the art that additions, modifications, substitutions, and deletions not specifically described may be made without departing from the spirit and scope of the invention as defined in the appended claims.

What is claimed is:

1. A mechanical chuck for a shank of a tool or toolholder, comprising:
   a receiver having a hollow portion terminating in a axially forwardly open socket in which the shank is positionable, and an external screw thread surrounding said socket,
   a pull rod mounted to said receiver for longitudinal front-to-rear reciprocation along said axis in said hollow portion, a front portion of said pull rod including connector means connectible with the shank,
   a plurality of pins slidably mounted for front-to-rear movement in borings of said receiver, rear ends of said pins being engageable with a rear portion of said pull rod so that rearward movement of said pins is transmitted to said pull rod, and a nut threadably mounted on said external screw thread and being engageable with front ends of said pins such that rotation of said nut in one direction produces rearward movement of said nut which is transmitted to said pull rod by said pins so that said pull rod pulls the tool shank tightly into said socket.

2. A mechanical chuck according to claim 1, wherein said borings lie in respective planes which also contain said axis, each boring forming an included angle with said axis of less than 45 degrees.

3. A mechanical chuck according to claim 2, wherein said angle is about 30 degrees.

4. A mechanical chuck according to claim 1, wherein said external thread extends axially for a distance which is less than the axial length of said nut.

5. A mechanical chuck according to claim 1, wherein said nut includes a support surface engaging said front end of each pin, said support surface forming, together with a line extending perpendicular to said axis, a first angle equal to a second angle which each pin forms together with said axis.

6. A mechanical chuck according to claim 5, wherein said nut includes a V-shaped annular groove, said support surface being defined by a surface of said groove.

7. A mechanical chuck according to claim 1, wherein said pull rod includes a generally cylindrical web extending along said axis, and a transverse flange disposed at a rear end of said web, said pins being engageable with said flange, said connector means comprising a plurality of fingers which are mounted on, and movable relative to, said web between socket-connect and socket-release portions.

8. A mechanical chuck according to claim 7 including a support ring in which rear ends of said fingers are rotatably mounted, said support ring disposed in said hollow portion of said receiver, and a spring biasing said support ring forwardly against a stop formed in said receiver.

9. A mechanical chuck according to claim 1 including a spring for biasing said pull rod forwardly, said spring being yieldable under a rearward force imposed by said pins.

10. A mechanical chuck according to claim 1, wherein said receiver is rotatably mounted.

11. A mechanical chuck according to claim 1, wherein said socket tapers rearwardly.

12. A mechanical chuck according to claim 11, wherein said socket is of polygonal cross-section.

13. A mechanical chuck according to claim 12, wherein said polygonal socket includes rounded corners, and slightly concave sides.

14. A mechanical chuck according to claim 12, wherein said polygonal socket is generally in the shape of an equilateral triangle.

15. A mechanical chuck according to claim 12, wherein said hollow portion includes a rear space disposed rearwardly of said socket and contiguous therewith, said pull rod having a transverse flange at its rear end dimensioned to slide axially through said socket and into said rear space when said flange is in a particular rotational orientation relative to said socket and to be secured in said rear spaced upon rotation of said pull rod out of said particular rotational orientation.

16. A mechanical chuck according to claim 15 including a support ring disposed in said rear space and formed of an elastic material, said connector means comprising fingers pivotably mounted in said support ring.

17. A mechanical chuck according to claim 1, wherein an outer surface of said nut has means for connection with a drive means.

18. A mechanical chuck according to claim 17, wherein said outer surface has teeth.

19. A mechanical chuck according to claim 18 including a pinion mounted to engage said teeth.

20. A mechanical chuck according to claim 19 including a gripping device for gripping a shank, said pinion being mounted on said gripping device.

21. A mechanical chuck according to claim 1, wherein said receiver has a rear side, and a mounting side, and a mounting element mounted on said rear side for making connection with a machine tool interface.

22. A mechanical chuck according to claim 21, wherein said mounting element includes a flange.

23. A mechanical chuck according to claim 22, wherein said mounting element includes a centering element.

24. A mechanical chuck according to claim 23, wherein said centering element comprises a centrally positioned centering pin.

25. A mechanical chuck according to claim 23, wherein said centering element comprises a rotatable collar having a cylindrical centering surface.

* * * * *